(12) United States Patent
Bentivoglio et al.

(10) Patent No.: US 11,214,352 B2
(45) Date of Patent: Jan. 4, 2022

(54) CONTROL SURFACE FOR AN AIRCRAFT, AND AIRCRAFT HAVING A FLEXIBLE CONTROL SURFACE

(71) Applicant: Airbus Operations GmbH, Hamburg (DE)

(72) Inventors: Marc Antonio Bentivoglio, Hamburg (DE); Marco Biondini, Hamburg (DE); Michael Hoeft, Hamburg (DE); Henrik Luettmann, Hamburg (DE); Malte Werwer, Hamburg (DE); Andre Thomas, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 709 days.

(21) Appl. No.: 16/133,087

(22) Filed: Sep. 17, 2018

(65) Prior Publication Data

US 2019/0084665 A1 Mar. 21, 2019

(30) Foreign Application Priority Data

Sep. 15, 2017 (DE) ...................... 10 2017 216 399.2

(51) Int. Cl.
*B64C 3/48* (2006.01)
*B64C 3/26* (2006.01)
(Continued)

(52) U.S. Cl.
CPC .................. *B64C 3/48* (2013.01); *B64C 3/26* (2013.01); *B64C 13/40* (2013.01); *B64C 13/50* (2013.01)

(58) Field of Classification Search
CPC .. B64C 3/48; B64C 3/26; B64C 13/40; B64C 13/50; B64C 13/34; B64C 9/02;
(Continued)

(56) References Cited

U.S. PATENT DOCUMENTS 1,567,531 A * 12/1925 Magni ....................... B64C 3/48
244/215
1,773,530 A * 8/1930 Mark ........................ B64C 3/48
244/196
(Continued)

FOREIGN PATENT DOCUMENTS

DE 198 52 944 C1 2/2000
DE 19936721 B4 2/2001
(Continued)

OTHER PUBLICATIONS

German Search Report; priority document.

*Primary Examiner* — Medhat Badawi
*Assistant Examiner* — Vicente Rodriguez
(74) *Attorney, Agent, or Firm* — Greer, Burns & Crain, Ltd.

(57) ABSTRACT

A control surface of an aircraft comprises a fixed skin panel, a first flexurally elastic skin panel and a second flexurally elastic skin panel, which is connected to the first flexurally elastic skin panel and is configured to at least partially overlap the fixed skin panel. Furthermore, the control surface comprises an actuator system, which is configured to move the second flexurally elastic skin panel parallel to the fixed skin panel, wherein the actuator system has a fixed structural element arranged in a root region of the control surface, and a structural element that is movable relative to the fixed structural element.

12 Claims, 4 Drawing Sheets

(51) Int. Cl.
*B64C 13/40* (2006.01)
*B64C 13/50* (2006.01)

(58) Field of Classification Search
CPC ....... B64C 3/50; B64C 9/16; B64C 2003/445; B64C 27/473
See application file for complete search history.

(56) References Cited

U.S. PATENT DOCUMENTS

| | | | |
|---|---|---|---|
| 1,918,897 A * | 7/1933 | Colburn | B64C 3/48 244/210 |
| 2,258,490 A * | 10/1941 | Gutridge | B64C 3/48 244/219 |
| 3,109,613 A * | 11/1963 | Bryant | B64C 3/48 244/219 |
| 3,179,357 A * | 4/1965 | Lyon | B64C 3/48 244/219 |
| 3,994,451 A | 11/1976 | Cole | |
| 4,475,702 A | 10/1984 | Cole | |
| 6,010,098 A * | 1/2000 | Campanile | B64C 3/48 244/219 |
| 6,276,641 B1 | 8/2001 | Gruenewald et al. | |
| 7,384,016 B2 | 6/2008 | Kota et al. | |
| 9,033,283 B1 | 5/2015 | Hemmelgarn et al. | |
| 9,598,167 B2 * | 3/2017 | Grip | B64C 3/50 |
| 9,735,647 B2 * | 8/2017 | Defosse | H02K 7/10 |
| 2010/0224734 A1 | 9/2010 | Grip | |
| 2015/0029879 A1 | 10/2015 | Carballo et al. | |
| 2016/0159456 A1 | 6/2016 | Haslach | |

FOREIGN PATENT DOCUMENTS

| | | |
|---|---|---|
| DE | 102013011917 A1 | 1/2015 |
| FR | 922899 A | 6/1947 |
| JP | 2014037155 A | 2/2014 |
| NL | 2006936 C | 12/2012 |
| WO | 2004108525 A1 | 12/2004 |
| WO | 2009095170 A2 | 8/2009 |

\* cited by examiner

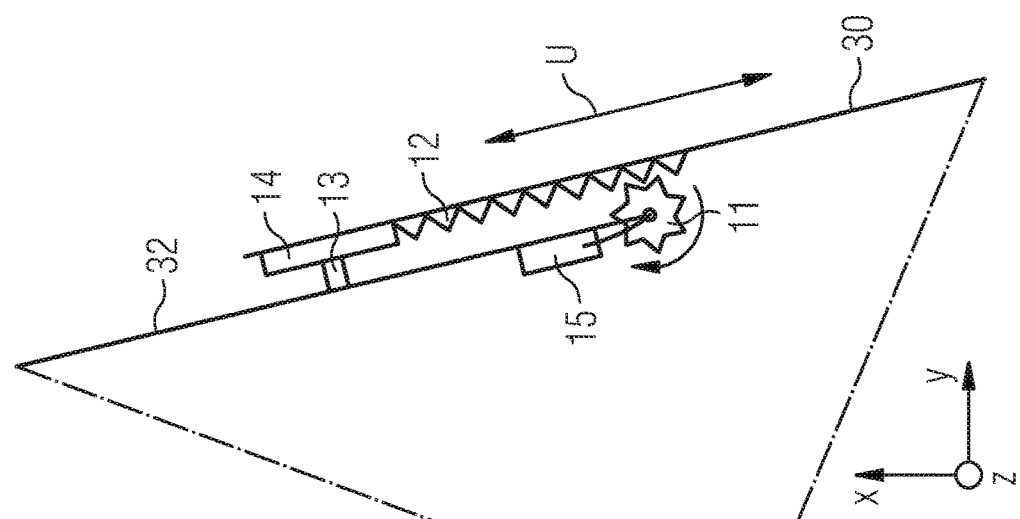
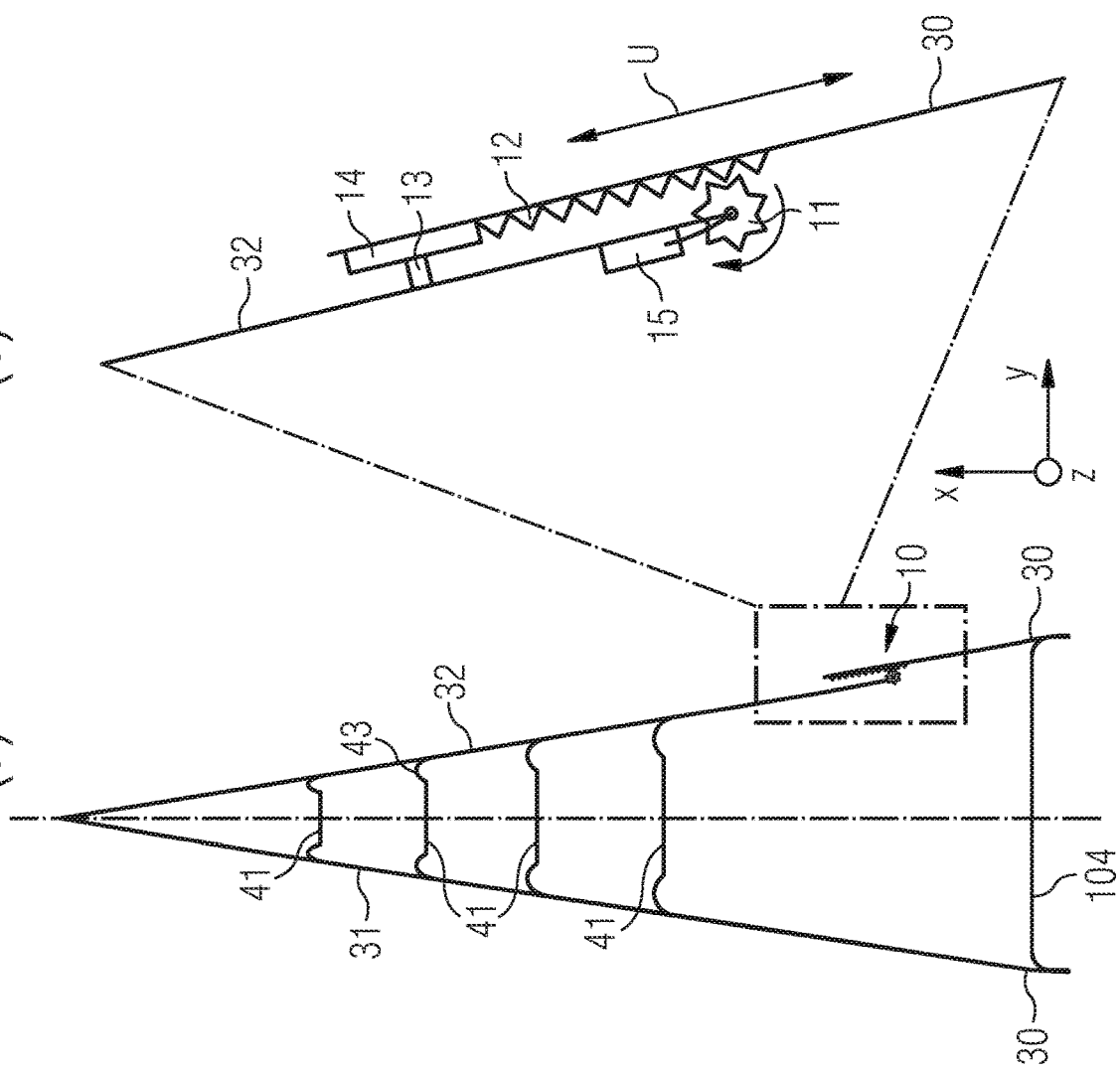
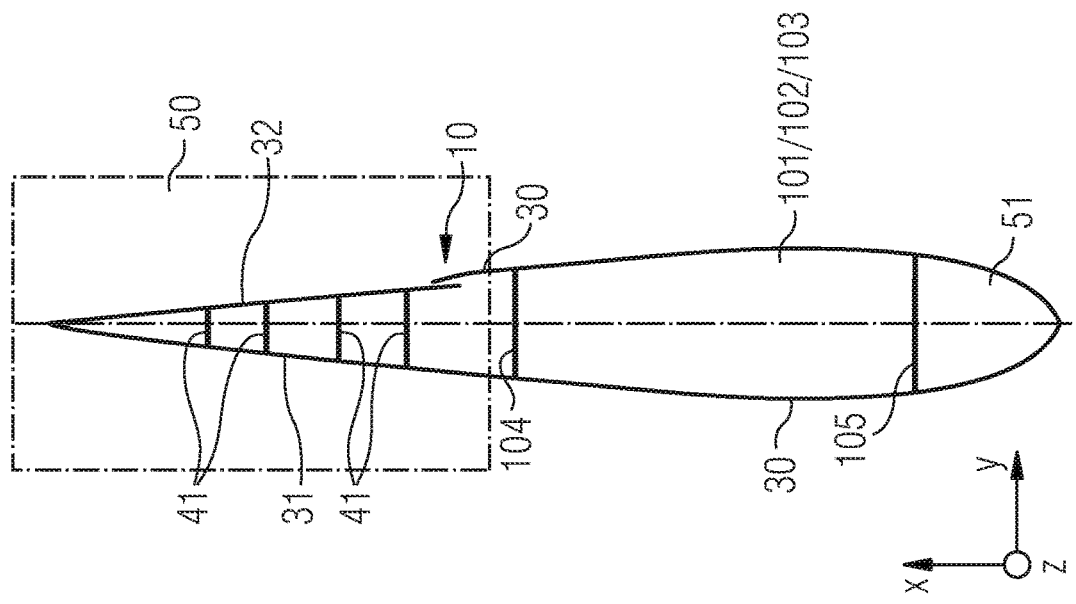

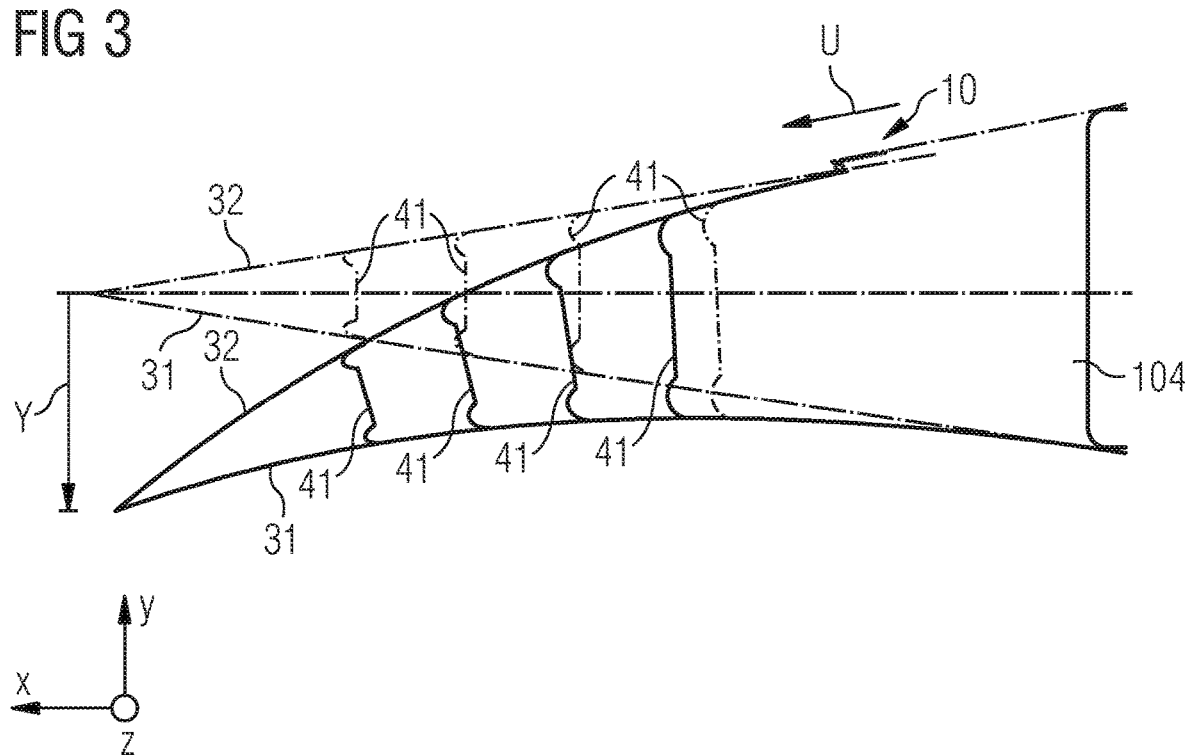

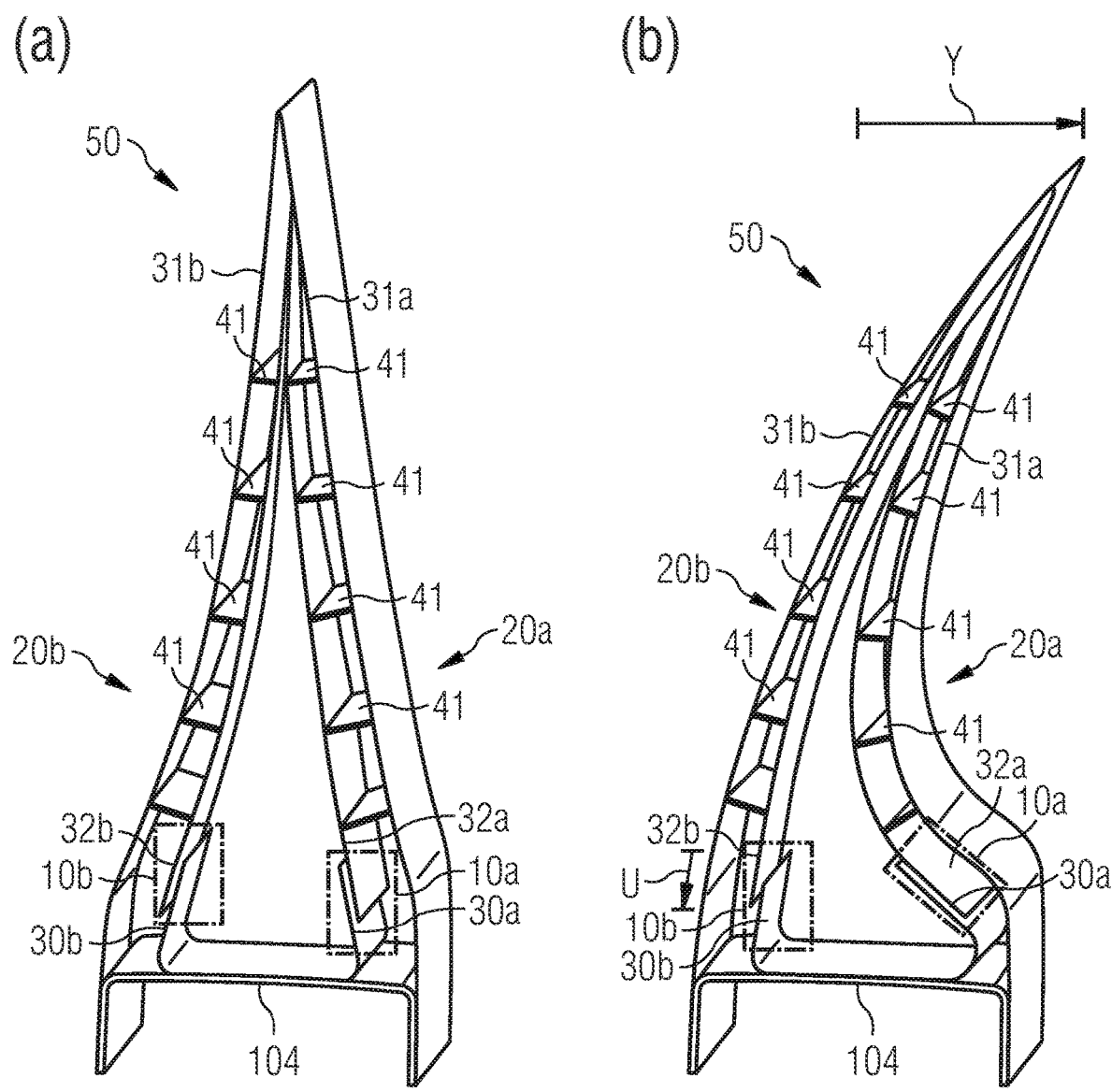

CONTROL SURFACE FOR AN AIRCRAFT, AND AIRCRAFT HAVING A FLEXIBLE CONTROL SURFACE

CROSS-REFERENCES TO RELATED APPLICATIONS

This application claims the benefit of German patent application No. 10 2017 216 399.2 filed on Sep. 15, 2017, the entire disclosures of which are incorporated herein by way of reference.

BACKGROUND OF THE INVENTION

The invention relates to a control surface for an aircraft and to an aircraft having at least one such control surface. In particular, the invention relates to a flexible control surface and to an aircraft having such a flexible control surface.

In order to control aircraft, movable parts are arranged on components over which air flows, for example wings or a tail unit, in order to influence the flow of the air. Thus, at a front edge (leading edge) and/or at a rear edge (trailing edge) of a wing or of a tail unit, flaps or rudders are arranged, which can change the direction of flow of the air flowing over the components, depending on the flight situation.

The kinks or even gaps in the outer skin that arise at the transition between a fixed outer skin of the wing or of the tail unit and such flaps or rudders impair the aerodynamics of the aircraft and thus increase the fuel consumption. In order to improve the aerodynamics, flexible control surfaces have been proposed, which have an expandable and/or bendable outer skin. However, the movement mechanisms for setting a particular shape of these flexible control surfaces are quite complex and thus susceptible to faults.

SUMMARY OF THE INVENTION

The invention is based on an object of providing a control surface of an aircraft, the control surface being formed in a simple manner and yet allowing a large range of movement of the control surface. Furthermore, a continuous transition between a movable skin of the control surface and a fixed skin of a wing or of a tail unit needs to be ensured.

To this end, the invention teaches a control surface of an aircraft, wherein the control surface comprises a fixed skin panel, a first flexurally elastic skin panel, and a second flexurally elastic skin panel. The second flexurally elastic skin panel is connected to the first flexurally elastic skin panel and is furthermore designed to at least partially overlap the fixed skin panel. An overlap of the two skin panels means an arrangement of the two skin panels in respective planes, wherein the two planes extend substantially parallel to one another. In the overlap region of the second flexurally elastic skin panel and the fixed skin panel, the second flexurally elastic skin panel and the fixed skin panel can be at least partially in contact or rest against one another.

It is, of course, also possible for the second flexurally elastic skin panel and the fixed skin panel to be spaced apart from one another in the overlap region. For aerodynamic reasons, it is appropriate for the skin panel which is arranged further forward (upstream) in the direction of flow of the air flowing around the control surface to form an outer skin panel, while the other is arranged on an inner side, with regard to the control surface, of the outer skin panel. Furthermore, the second flexurally elastic skin panel and the fixed skin panel can be arranged such that a periphery of the outer skin panel (a trailing edge, located at the rear in the direction of flow, of the outer skin panel) is substantially perpendicular to the direction of flow.

The control surface can furthermore comprise an actuator system, which is designed to move the second skin panel parallel to the fixed skin panel. In other words, the size of the overlap region between the second flexurally elastic skin panel and the fixed skin panel can be changed by the actuator system.

For example, the actuator system can have a fixed structural element arranged in the root region of the control surface, and a structural element that is movable relative to the fixed structural element. The root region of the control surface is the region in which the control surface adjoins a fixed component of the aircraft. The root region of the control surface is the region of the two flexurally elastic skin panels that is located on the opposite side from a region in which the first flexurally elastic skin panel is connected to the second flexurally elastic skin panel.

The first and second flexurally elastic skin panels thus form a body that is open on one side, wherein at least the actuator system is arranged in a region of the opening in the body thus formed. The first and second flexurally elastic skin panels can be produced from a continuous material, wherein the material extends away from the opening in the region of the first skin panel, forms a turning point and extends back to the actuator system in the region of the second skin panel. The material can be, for example, a fiber-reinforced plastic or a metal, for example aluminum.

In each case, the control surface has a location furthest from the opening. This location can form a leading edge (front edge) or trailing edge (rear edge) of a wing or of a tail unit. In other words, the control surface is arranged at the leading edge or trailing edge of the wing or of the tail unit, wherein the first and second flexurally elastic skin panels are the outer skin, forming the leading edge or trailing edge, of the wing or of the tail unit.

On account of the flexibility of the control surface, i.e., of the two flexurally elastic skin panels, the two skin panels can be curved by the movement of the second flexurally elastic skin panel, for example when the two flexurally elastic skin panels are connected together in a rotationally fixed manner at a point. Thus, as a result of a simple structure of the actuator system, i.e., with few components and a single actuator, a control surface can be moved.

In one configuration, the fixed structural element of the actuator system can be a toothed rack, and the movable structural element of the actuator system can be a toothed wheel driven by a movement device. This form of the actuator system is lightweight and cost-effective, since only one movable structural element is required, and conventional components are used.

In a further configuration, the fixed structural element of the actuator system can be a stator of an electromagnetic actuator, and the movable structural element of the actuator system can be a rotor of the electromagnetic actuator. For example, the electromagnetic actuator can be implemented in the form of a linear motor, such that a linear movement of the second skin panel with respect to the fixed skin panel is allowed in a very simple manner. Of course, it is also possible for a rotation motor or servomotor to be used as the electromagnetic actuator. An electromagnetic actuator system affords a robust actuator system for the control surface.

In a further configuration, the fixed structural element of the actuator system can be a cylinder of a pneumatic or hydraulic actuator, and the movable structural element of the actuator system can be a piston of the pneumatic or hydraulic actuator. Although a pneumatic or hydraulic actuator requires additional lines and a delivery device for generating a pneumatic or hydraulic pressure, it is possible, with a pneumatic or hydraulic actuator system, to set the relative movement of the second flexurally elastic skin panel with respect to the fixed skin panel in a continuously variable or at least very finely graduated manner. Furthermore, it is also possible to use a delivery device that is already present for other purposes, as is conventional in the structure of aircraft.

Of course, it is also possible to use combinations of these configurations of the actuator system on a control surface. For example, it is possible for rough orientation of the control surface to be performed by means of a toothed wheel and toothed rack, while fine adjustment of the control surface is carried out by means of an electromagnetic or pneumatic/hydraulic actuator system. In each of the configurations of the actuator system, the latter can additionally comprise a gear mechanism. As a result of an appropriate transmission ratio in the gear mechanism, the actuator system can be configured in a smaller (more compact) manner.

Alternatively or additionally, the fixed structural element of the actuator system can be fastened to the fixed skin panel and the movable structural element of the actuator system can be fastened to the second flexurally elastic skin panel. This arrangement of the actuator system is appropriate in particular for the electromagnetic and the pneumatic or hydraulic actuator system, since this type of actuator system also comprises a fixed structural element.

Alternatively, the fixed structural element of the actuator system can be fastened to the second flexurally elastic skin panel and the movable structural element of the actuator system can be fastened to the fixed skin panel. This configuration is advantageous for example in the case of a toothed rack which is attached to or integrated in the second flexurally elastic skin panel, since the drive for the toothed wheel that engages with the toothed rack can be arranged on the fixed skin panel and the loads thereof do not act on the movable flexurally elastic skin panel.

Furthermore, the control surface can comprise at least one spar arranged between the first flexurally elastic skin panel and the second flexurally elastic skin panel. The at least one spar is arranged in a region between the first flexurally elastic skin panel and the second flexurally elastic skin panel.

In this case, the at least one spar can comprise a flexurally elastic spar, which is connected to the first flexurally elastic skin panel and the second flexurally elastic skin panel in a rotationally fixed manner. The flexurally elastic spar can have a curved shape (for example approximately semicircular) in a cross section of the wing or of the tail unit, wherein an opening of this curved shape points towards the root region of the control surface. Not only does the at least one flexurally elastic spar stabilize the control surface formed by the first and second flexurally elastic skin panels on account of its connecting of the two flexurally elastic skin panels, the at least one flexurally elastic spar also allows at least one of the flexurally elastic skin panels to bend on account of the movement, effected by the actuator system, of the second flexurally elastic skin panel relative to the fixed skin panel.

Alternatively or additionally, the at least one spar can comprise a rigid spar, which is connected to the first flexurally elastic skin panel and the second flexurally elastic skin panel via in each case one joint. The rigid spar likewise stabilizes the two flexurally elastic skin panels of the control surface and also allows the second flexurally elastic skin panel to move relative to the fixed skin panel as a result of the arrangement of the joints. The joints are arranged on an inner side of the two flexurally elastic skin panels located opposite one another. In addition, the spacing between the first and second flexurally elastic skin panels is maintained by the rigid spar even during the movement of the second flexurally elastic skin panel in an opposite direction relative to the fixed skin panel.

According to a further configuration, the control surface can furthermore comprise a further fixed skin panel, a third flexurally elastic skin panel and a fourth flexurally elastic skin panel. In this case, the fourth flexurally elastic skin panel can be designed to at least partially overlap the further fixed skin panel. The further fixed skin panel and the third and fourth flexurally elastic skin panels are thus constructed in an identical manner to the first-mentioned fixed skin panel with the first and second flexurally elastic skin panels. It is also possible for the configurations and variants described for the first-mentioned fixed skin panel with the first and second flexurally elastic skin panels to be applied to the further fixed skin panel with the third and fourth flexurally elastic skin panels.

Furthermore, the first to fourth flexurally elastic skin panels can be connected together at a common point. The first to fourth flexurally elastic skin panels thus form a common control surface, wherein the first and third flexurally elastic skin panels form outer skins of the control surface. The second and fourth flexurally elastic skin panels, by contrast, are arranged in the interior of the control surface.

If, in the case of a control surface configured in such a way, the second flexurally elastic skin panel is now moved by the actuator system, a movement of the entire control surface, consisting of the first to fourth flexurally elastic skin panels, takes place, since all the skin panels are connected together at a common point. This common point can form a leading edge or trailing edge. On account of the greater number of flexurally elastic skin panels, a deflection of the common point with an identical path of movement of the actuator system is greater than in the case of the control surface having only two flexurally elastic skin panels.

In addition, the control surface can also comprise a further actuator system, which is designed to move the fourth skin panel parallel to the further fixed skin panel. In this case, the further actuator system can have a fixed structural element arranged in the root region of the control surface, and a structural element that is movable relative to the fixed structural element. As a result of the use of the further actuator system, the shape of the control surface can be rendered more variable. In addition, a redundant control system in the form of a redundant actuator system for increasing the operational reliability is also present.

Alternatively, the control surface can also comprise only a third flexurally elastic skin panel and a fourth flexurally elastic skin panel, wherein the first to fourth flexurally elastic skin panels are connected together at a common point, and wherein the third flexurally elastic skin panel has a free end located on the opposite side from the common point. In other words, the third flexurally elastic skin panel is free (not supported) in a root region of the control surface.

In this configuration, it is also possible to dispense with the (first) fixed skin element, since it is located in the interior of the control surface and thus a skin element is not necessary. Instead, any desired fixed component (even in the wing or the tail unit) can be used, to which a part of the actuator system is fastened, in order to effect the movement of the second flexurally elastic skin panel relative thereto.

In each of the described control-surface variants, it is possible for at least one spar to be arranged between the third flexurally elastic skin panel and the fourth flexurally elastic skin panel, the spar connecting the third flexurally elastic skin panel to the fourth flexurally elastic skin panel. As a result, the stability of the components of the control surface is increased.

In each of the configurations of the control surface with a total of four flexurally elastic skin panels, a continuous outer skin of the wing or of the tail unit can be achieved, which can be formed without edges or openings. In other words, each of the flexurally elastic skin panels which is located on an outer side of the control surface can be formed so as to be flush and/or continuous with a fixed skin panel. As a result of the arrangement of one or more actuators on at least one of the internal flexurally elastic skin panels, the deflection of the control surface can still be brought about in a simple manner.

According to a further aspect, an aircraft comprises at least one flexible control surface in one of the above-described configurations and variants.

The aircraft furthermore comprises a wing and/or tail unit, wherein the fixed structural element of the actuator system is fastened to or integrated in an immovable component of the wing or of the tail unit. The immovable component of the wing or of the tail unit can be a spar arranged in the longitudinal direction of the wing or of the tail unit. Of course, the main element of the actuator system can also be fastened to or integrated in one or more ribs arranged in the transverse direction of the wing or of the tail unit.

Alternatively or additionally, the first skin panel of the control surface can be arranged so as to be flush with a first outer skin of the wing or of the tail unit. Furthermore, the second skin panel of the control surface can be arranged so as to be flush with a second outer skin of the wing or of the tail unit, the second outer skin being located on the opposite side from the first outer skin. In other words, the first and second skin panels form portions of the two outer skins of the wing or of the tail unit, which are located on opposite sides in a cross section of the wing or of the tail unit.

On account of the movement of the second flexurally elastic skin panel relative to the fixed skin panel, it is possible for a portion of expandable outer skin to be arranged between the outer skin of the wing or of the tail unit and the second flexurally elastic skin panel. Alternatively, the first skin panel and/or the second skin panel can at least partially comprise an expandable material, such that no opening arises at the transition between the skin panel and the rest of the outer skin of the wing or of the tail unit on account of the movement of the control surface that is effected by the actuator system.

Furthermore, the first and second skin panel form a leading edge (front edge) or trailing edge (rear edge) of the wing or of the tail unit. In other words, the control surface is arranged at the leading edge or trailing edge of the wing or of the tail unit, wherein the first and second skin panels are the outer skin, forming the leading edge or trailing edge, of the wing or of the tail unit.

Alternatively, the first skin panel of the control surface can be arranged so as to be flush with a first outer skin of the wing or of the tail unit. Furthermore, the third skin panel of the control surface can be arranged so as to be flush with a second outer skin of the wing or of the tail unit, the second outer skin being located on the opposite side from the first outer skin. In other words, the first and third skin panels form portions of the two outer skins of the wing or of the tail unit, which are located on opposite sides from one another in a cross section of the wing or of the tail unit.

The arrangements described herein of the components of the actuator system and of the control surface relate in particular to a view in cross section of the wing or of the tail unit. Furthermore, the skin panels of the control surface have air flowing over them, the direction of flow of which is intended to be changed by the skin panels. Thus, a movement of the flexurally elastic skin panel that is brought about by the actuator system can run in the cross-sectional plane.

Rather than an aircraft, the control surfaces described herein can also be arranged on other vehicles, including motor vehicles and watercraft. On account of the control by the actuator system, the flow of any fluid which flows over the skin panels of the control surface can be influenced.

BRIEF DESCRIPTION OF THE DRAWINGS

Exemplary embodiments of the invention are described in more detail in the following text with reference to the drawings.

FIG. 1 schematically shows an exemplary cross section of a wing or of a tail unit;

FIG. 2 schematically shows a control surface having two flexurally elastic skin panels in cross section and an enlarged detail thereof, which comprises an actuator system;

FIG. 3 schematically shows a deflection of the control surface from FIG. 2 by an actuator system;

FIG. 4 schematically shows a control surface, which is formed from four flexurally elastic skin panels, and a deflected state of the control surface;

DETAILED DESCRIPTION OF THE PREFERRED EMBODIMENTS

According to the invention described herein, a control surface for an aircraft and a corresponding aircraft are provided.

FIG. 1 schematically shows an exemplary cross section of a wing or of a tail unit of an aircraft or of some other vehicle that moves through a fluid. A control surface 50, 51 comprises at least one fixed skin panel 30, a first flexurally elastic skin panel 31 and a second flexurally elastic skin panel 32.

Figure 6:
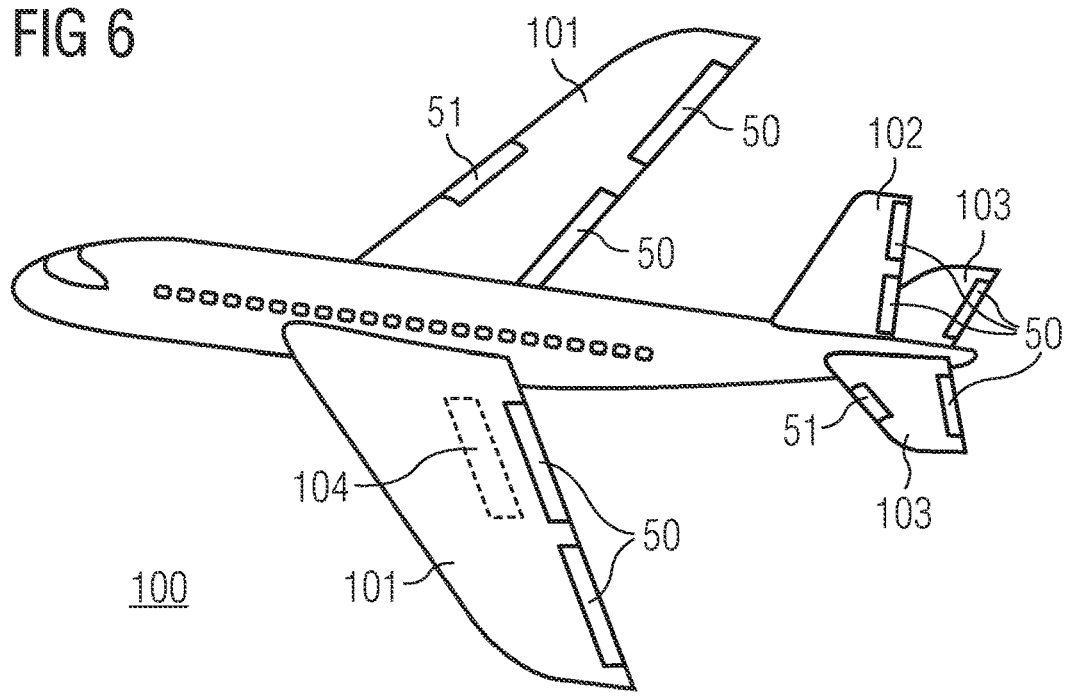
FIG. 6 shows an aircraft having a multiplicity of control surfaces.

Such control surfaces 50, 51 can be arranged on an aircraft 100, as is illustrated in FIG. 6. The flexurally elastic skin panels 31, 32 form at least portions of the outer skin of a wing 101 or of a tail unit 102, 103 of the aircraft 100. In this case, the flexurally elastic skin panels 31, 32 can form control surfaces 50 on a trailing edge of the wing 101 or of the tail unit 102, 103 (see also FIG. 1 above). Likewise, control surfaces 51 can also be formed on a leading edge or front edge of the wing 101 or of the tail unit 103 (see also FIG. 1 below) in one of the configurations described herein.

In the case of the control surfaces 50, 51 illustrated in FIG. 1, the illustrated Z axis extends perpendicularly to the plane of the drawing, wherein the Z axis in aircraft 100 is usually illustrated as an axis extending vertically through the aircraft 100. Thus, the illustrated control surfaces 50, 51 in FIG. 1 are arranged in a portion of a vertically arranged tail unit 102. Of course, the illustrated control surfaces 50, 51 can also be control surfaces 50, 51 in a wing 101 and/or in a horizontal tail unit 103. For that purpose, it would merely be necessary for the designations of the Y axis and the Z axis to be exchanged (wherein the Y axis in aircraft 100 usually illustrates the horizontal direction extending transversely to the direction of flight).

In order to form the trailing edge or leading edge, the two flexurally elastic skin panels 31, 32 are connected together. Alternatively, the flexurally elastic skin panels 31, 32 are produced from a material which is bent or deflected appropriately at the trailing edge or leading edge (has a turning point). FIG. 1 illustrates a trailing edge, in the case of which the flexurally elastic skin panels 31, 32 meet at an acute angle. However, in particular, at the leading edge, it is possible for the flexurally elastic skin panels 31, 32 to form a continuous, aerodynamically efficient curve.

The second flexurally elastic skin panel 32 at least partially overlaps the fixed skin panel 30. In this case, the skin panel 30, 32 which is located further forwards (upstream) in the direction of flow of the fluid flowing around the control surface 50, 51 is arranged further out, such that a gap, into which the fluid could penetrate on account of its flow, is not formed between the two skin panels 30, 32.

The control surface 50, 51 comprises an actuator system 10, which moves the second flexurally elastic skin panel 32 parallel to the fixed skin panel 30. The actuator system 10 is, in this case, arranged in the overlap region of the second flexurally elastic skin panel 32 with the fixed skin panel 30. For example, the actuator system 10 and the overlap region of the two skin panels 30, 32 can be located in a root region of the control surface 50, 51. The root region of the control surface 50, 51 is that region of the wing 101 or of the tail unit 102, 103 that experiences only little movement or is even (still) stationary compared with the rest of the wing 101 or of the tail unit 102, 103. The root region of the control surface 50, 51 can be located on a fixed spar 104, 105, to which the fixed skin panel 30 is fastened. The spar 104, 105 extends substantially parallel to a longitudinal direction of the wing 101 or of the tail unit 102, 103.

It is also possible for spars 41 to be located in a region between the flexurally elastic skin panels 31, 32, the spars 41 being illustrated only on the control surface 50 formed at the trailing edge in FIG. 1 for the sake of clarity of the drawing. These spars 41 can be produced from a flexurally elastic material and be connected at their respective ends to the first flexurally elastic skin panel 31 and the second flexurally elastic skin panel 32, respectively. Alternatively, the spars 41 can be produced from a rigid, shear-resistant material and be rotatably connected at corresponding joints (not illustrated) to the respective flexurally elastic skin panels 31 and 32. Such spars 41 increase the stability of the flexurally elastic skin panels 31, 32 and thus of the control surface 50, 51.

FIG. 2 shows a schematic cross section of the control surface 50, i.e., an enlargement of the region illustrated with a border in FIG. 1. Arranged on both sides of the fixed spar 104 is a fixed skin panel 30. On the left-hand side in FIG. 2, this fixed skin panel 30 transitions into a flexurally elastic skin panel 31. This can be ensured either via a flush connection of the two skin panels 30, 31, or, alternatively, the fixed skin panel 30 can also be formed from a flexurally elastic material and be rendered immovable by corresponding fixed spars 104, 105, while it is bendable in the X-Y plane in the region of the control surface 50, 51. Likewise alternatively, the material used for the skin panels 30, 31 can change in a smooth transition. For example, a fiber-reinforced plastic can be used for both skin panels 30, 31, the fibers and/or plastics material of which change in a portion between the fixed spar 104 and the trailing edge (upper tip in FIG. 2), in order to achieve greater flexural elasticity.

On the opposite side of the control surface 50, 51 there is likewise located a fixed skin panel 30 and a second flexurally elastic skin panel 32. These skin panels 30, 32 can be produced in the same way as the skin panels 30, 31 on the opposite side of the control surface 50, 51. Located between the flexurally elastic skin panels 31, 32 are the spars 41. The latter are illustrated in FIG. 2 as rigid spars 41 with an elastic connection to the respective flexurally elastic skin panel 31, 32. In other words, the spars 41 have, at their respective ends, elastic connectors 43, by way of which they are connected to the flexurally elastic skin panels 31, 32.

In part (b) of FIG. 2, an enlarged detail of the actuator system 10 and of an overlap region of the fixed skin panel 30 with the flexurally elastic skin panel 32 is furthermore shown. In this region, the actuator system 10 has a fixed structural element 12, 14 and a structural element 11, 13 that is movable relative to the fixed structural element 12, 14.

In the exemplary configuration illustrated, a toothed rack 12 is arranged on the fixed skin panel 30, the toothed rack 12 likewise being fixed with respect to the control surface 50, 51. Illustrated on the flexurally elastic skin panel 32 is a toothed wheel 11, which can be driven via a movement device 15. The toothed wheel 11 is engaged with the toothed rack 12. As a result, by rotation of the toothed wheel 11, the flexurally elastic skin panel 32 can be moved parallel to the fixed skin panel 30 in the opposite directions indicated by the double arrow "U".

In order to support the movement of the flexurally elastic skin panel 32 in the direction U, a rail 14 can be arranged on the fixed skin panel 30, a slide 13, which is coupled to the second flexurally elastic skin panel 32, sliding in the rail 14.

Alternatively, the elements 13 and 14 in FIG. 2 can also represent a stator 14 and rotor 13 of an electromagnetic actuator or a cylinder 14 and piston 13 of a pneumatic or hydraulic actuator. These actuators can be provided as an alternative or in addition to the toothed rack 12 and the toothed wheel 11 in order to move the control surface 50, 51.

In an alternative configuration, the elements 11 to 14 can also be attached to the fixed skin panel 30 and the flexurally elastic skin panel 32 the other way around. For example, it is advantageous to arrange fixed elements, for example the toothed rack 12, the stator 14 and the cylinder 14, on the fixed skin panel 30, while the moving elements, for example the toothed wheel 11, the rotor 13 and the piston 13, are attached to the flexurally elastic skin panel 32. Alternatively, it is also possible for the respectively heavier elements of the actuator system to be fastened to the fixed skin panel or the fixed spar 104, 105, while the lighter corresponding elements are attached to the flexurally elastic skin panel.

The movement, brought about by the actuator system 10, of the flexurally elastic skin panel 32 causes a movement (deformation) of the control surface 50, 51, which is illustrated, for example, in FIG. 3. FIG. 3 illustrates the case in which the actuator system 10 moves the second flexurally elastic skin panel 32 in the direction of the trailing edge. As a result, the outer side of the wing 101 or of the tail unit 102, 103 becomes longer on the side of the actuator system 10, with the result that the trailing edge is moved counterclockwise with the movement component, illustrated in FIG. 3, in the Y direction. The movement of the control surface 50, 51 is possible on account of the flexurally elastic material of the skin panels 31, 32 and the connection thereof to the trailing edge (or leading edge). The spars 41 located between the skin panels 31, 32 bring about dimensional stability of the cross section of the control surface 50, 51, i.e., the spars 41 are pushed in the direction of the first flexurally elastic skin panel 31 by the movement of the second flexurally elastic skin panel 32, with the result that, again, the first flexurally elastic skin panel 31 is pushed counterclockwise via its surface.

A movement, brought about by the actuator system 10, in the opposite direction of course causes a clockwise deformation of the control surface 50, 51 (not illustrated in FIG. 3).

FIG. 4 schematically shows a cross section of a further configuration variant of the control surface 50, 51. The control surface 50, 51 illustrated in FIG. 4(a) has the same elements as the control surface 50, 51 in FIGS. 2 and 3. The corresponding components are identified by the same reference signs followed by "a." In addition, for example in a mirror-inverted manner, a third flexurally elastic skin panel 31b and a fourth flexurally elastic skin panel 32b are provided. The third and fourth flexurally elastic skin panels 31b and 32b are connected together at the illustrated trailing edge and are furthermore connected together with the first and second flexurally elastic skin panels 31a and 32a at the illustrated trailing edge. In the case of a control surface 51 at a leading edge, the four flexurally elastic skin panels 31a, 31b, 32a, 32b are of course connected together at the leading edge.

In this configuration variant, the control surface 50, 51 can also comprise a further fixed skin panel 30b. The fixed skin panels 30a and 30b, as are illustrated in FIG. 4, are arranged on the inner side (directed towards the middle of the wing 101 or of the tail unit 102, 103), wherein the second flexurally elastic skin panel 32a and the fourth flexurally elastic skin panel 32b are each moved relative to these fixed skin panels 30a and 30b by the actuator systems 10a and 10b.

In an alternative configuration, there is no need for any of the internal fixed skin panels 30a and 30b, since these do not form an outer skin of the wing 101 or of the tail unit 102, 103. Instead, fixed skin panels can be arranged on the respective outer sides of the wing 101 or of the tail unit 102, 103, which are adjoined in a flush manner by the first flexurally elastic skin panel 31a or the third flexurally elastic skin panel 31b, respectively, or are integrated therein (i.e., form a continuous outer skin). The actuator systems 10a and/or 10b can in this case be fastened to some other fixed element, for example, a fixed spar 104, 105.

In a likewise alternative configuration, only one of the two actuator systems 10a and 10b is provided. For example, in FIG. 4(b) only the fourth flexurally elastic skin panel 32b is moved in the direction "U" by a corresponding actuator system 10b. This creates a clockwise deflection of the control surface 50, 51 with the movement component "Y."

Figure 5:
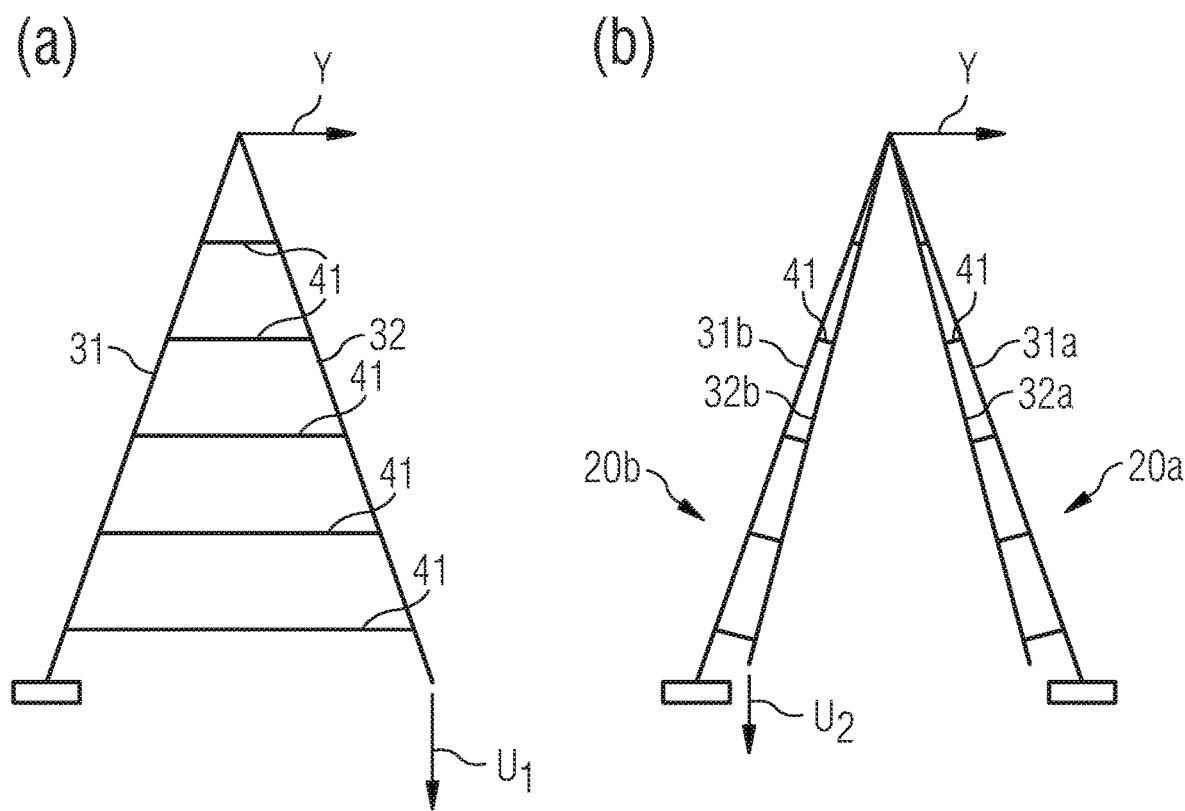
FIG. 5 schematically shows a comparison between the deflection of a control surface having two flexurally elastic skin panels and the deflection of a control surface having four flexurally elastic skin panels.

FIG. 5 schematically illustrates that the distance U1 to be covered by the respective actuator system 10 in the direction "U" is greater in the case of the control surface 50, 51 illustrated in FIGS. 2 and 3 than the distance U2 in the case of the control surface 50, 51 illustrated in FIG. 4, in order to effect an identical deflection of the trailing edge or leading edge in the direction "Y" or within the X-Y plane. The use of further flexurally elastic skin panels 31a, 31b, 32a, 32b brings about an enhancement of the deflection in the direction "Y" or within the X-Y plane given the same distance covered by the actuator system 10 in the direction "U."

Finally, it should be noted, in particular, that the variants, configurations and exemplary embodiments set out above serve merely to describe the claimed teaching, but do not limit the latter to the variants, configurations and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control surface of an aircraft, wherein the control surface comprises:
    a fixed skin panel;
    a first flexurally elastic skin panel, which is an outer skin;
    a second flexurally elastic skin panel, which is an outer skin which is directly connected to the first flexurally elastic skin panel at an acute angle or a continuous curve, forming a leading edge or trailing edge, and which is configured to at least partially overlap the fixed skin panel; and
    an actuator system which is configured to move the second flexurally elastic skin panel parallel to the fixed skin panel,
    wherein the actuator system has a fixed structural element arranged in a root region of the control surface, and a structural element movable relative to the fixed structural element, and
    wherein the fixed structural element of the actuator system is fastened to the fixed skin panel and the movable structural element of the actuator system is fastened directly to the second flexurally elastic skin panel, or
    wherein the fixed structural element of the actuator system is fastened to the second flexurally elastic skin panel and the movable structural element of the actuator system is fastened directly to the fixed skin panel.

2. The control surface according to claim 1, wherein the fixed structural element of the actuator system is a toothed rack, and the movable structural element of the actuator system is a toothed wheel driven by a movement device.

3. The control surface according to claim 1, wherein the fixed structural element of the actuator system is a stator of an electromagnetic actuator, and the movable structural element of the actuator system is a rotor of the electromagnetic actuator.

4. The control surface according to claim 1, wherein the fixed structural element of the actuator system is a cylinder of a pneumatic or hydraulic actuator, and the movable structural element of the actuator system is a piston of the pneumatic or hydraulic actuator.

5. The control surface according to claim 1, further comprising at least one spar arranged between the first flexurally elastic skin panel and the second flexurally elastic skin panel.

6. The control surface according to claim 5, wherein the at least one spar comprises at least one of
    a flexurally elastic spar, which is connected to the first flexurally elastic skin panel and the second flexurally elastic skin panel in a rotationally fixed manner, or a rigid spar, which is connected to the first flexurally elastic skin panel and the second flexurally elastic skin panel via, in each case, one joint.

7. The control surface according to claim 1, further comprising:
a further fixed skin panel;
a third flexurally elastic skin panel; and
a fourth flexurally elastic skin panel, which is configured to at least partially overlap the further fixed skin panel,
wherein the first to fourth flexurally elastic skin panels are connected together at a common point forming the leading edge or trailing edge.

8. The control surface according to claim 7, further comprising:
a further actuator system, which is configured to move the fourth skin panel parallel to the further fixed skin panel,
wherein the further actuator system has a fixed structural element arranged in the root region of the control surface, and a structural element that is movable relative to the fixed structural element.

9. The control surface according to claim 1, further comprising:
a third flexurally elastic skin panel;
a fourth flexurally elastic skin panel; and
at least one spar arranged between the third flexurally elastic skin panel and the fourth flexurally elastic skin panel,
wherein the first to fourth flexurally elastic skin panels are connected together at a common point forming the leading edge or trailing edge, and wherein the third flexurally elastic skin panel has a free end located on the opposite side from the common point.

10. An aircraft comprising at least one control surface according to claim 1.

11. The aircraft according to claim 10, further comprising at least one of:
a wing; or
a tail unit,
wherein the fixed structural element of the actuator system is fastened to or integrated in an immovable component of the at least one of the wing or the tail unit.

12. The aircraft according to claim 11, wherein the first flexurally elastic skin panel of the control surface is arranged so as to be flush with a first outer skin of the at least one of the wing or the tail unit, wherein the second flexurally elastic skin panel of the control surface is arranged so as to be flush with a second outer skin of the at least one of the wing or the tail unit, and wherein said second outer skin is located on an opposite side from the first outer skin.

* * * * *